United States Patent
Tuunanen et al.

(10) Patent No.: US 6,418,197 B1
(45) Date of Patent: Jul. 9, 2002

(54) METHOD OF PLAYING ANNOUNCEMENTS IN TELECOMMUNICATION NETWORK EXCHANGE

(75) Inventors: Heikki Tuunanen, Espoo; Aki Korhonen, Helsinki, both of (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/381,270

(22) PCT Filed: Jan. 25, 1999

(86) PCT No.: PCT/FI99/00047
§ 371 (c)(1),
(2), (4) Date: Nov. 22, 1999

(87) PCT Pub. No.: WO99/40709
PCT Pub. Date: Aug. 12, 1999

(30) Foreign Application Priority Data

Jan. 27, 1998 (FI) .................................................. 980176

(51) Int. Cl.⁷ .......................... H04M 1/64; H04M 15/00
(52) U.S. Cl. ................ 379/67.1; 379/88.03; 379/88.05; 379/88.19; 379/100.04; 379/112.01; 379/114.02; 379/121.02; 379/133
(58) Field of Search .......................... 379/67.1, 72, 76, 379/88.17, 88.22, 88.23, 112.01, 114.01, 114.04, 114.05, 114.12, 114.28, 115.01, 115.02, 121.02, 70, 88.03, 88.04, 88.05, 88.02, 88.14, 88.18, 88.19, 88.2, 88.21, 93.09, 100.04, 112.07, 114.09, 142.01, 142.02, 124, 131, 133, 144.07

(56) References Cited

U.S. PATENT DOCUMENTS

| | | | | |
|---|---|---|---|---|
| 4,823,374 A | | 4/1989 | Verlohr | 379/88.23 |
| 5,036,533 A | * | 7/1991 | Carter et al. | 455/413 |
| 5,134,646 A | * | 7/1992 | Carlson | 379/67.1 |
| 5,583,920 A | * | 12/1996 | Wheeler, Jr. | 379/88 |
| 5,715,306 A | * | 2/1998 | Sunderman et al. | 379/265 |
| 5,802,157 A | * | 9/1998 | Clarke et al. | 379/196 |
| 6,148,069 A | * | 11/2000 | Ekstrom et al. | 379/207 |
| 6,292,478 B1 | * | 9/2001 | Farris | 370/352 |

FOREIGN PATENT DOCUMENTS

| | | |
|---|---|---|
| EP | 0 818 913 | 1/1998 |
| WO | 95/22231 | 8/1995 |

* cited by examiner

*Primary Examiner*—Allan Hoosain
(74) *Attorney, Agent, or Firm*—Pillsbury Winthrop LLP

(57) ABSTRACT

A telecommunication network exchange and method of playing an announcement to a call party in a telephone exchange during connection set-up. The invention is based on the idea of totally separating the detection of the need for an announcement from playing the announcement. The need for the announcement is detected in a conventional manner at a given stage of call set-up. However, the exchange does not play the announcement immediately, but delays playing it up to a later stage of call set-up or up to a later event, if necessary. The announcement may be played, for example, not until collection of additional dialing is definitely terminated, the call is confirmed to be successful, the announcement is confirmed to be necessary/correct, and so on. As a consequence of the delayed playing of the announcement, wrong and unnecessary announcements and the failure of the call are thus avoided.

17 Claims, 8 Drawing Sheets

METHOD OF PLAYING ANNOUNCEMENTS IN TELECOMMUNICATION NETWORK EXCHANGE

Figure 1:
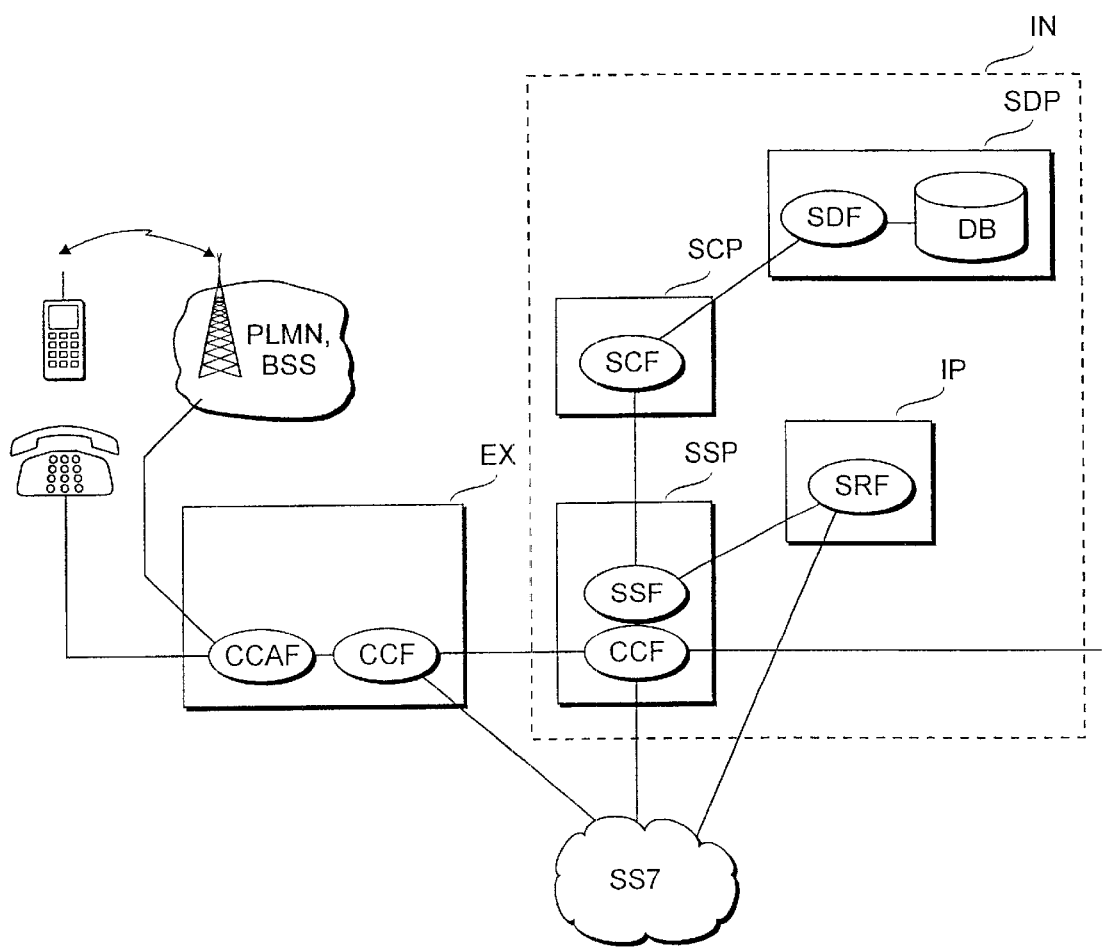

This application is the national phase of international application PCT/FI99/00047 filed Jan. 25, 1999 which is designated the U.S.

BACKGROUND OF THE INVENTION

The invention relates to call connection set-up and, more particularly, to playing announcements to a call party in a telephone exchange during connection set-up.

Telecommunication network exchanges are responsible for call set-up control and switching of a connection between subscribers. In the most simple case, the exchange receives a call set-up request from the calling party or from another exchange and switches the connection further to the called party or to the next exchange. In practice, the operation of the telephone exchange during call set-up is a complicated process which includes a number of successive sub-processes. These may include subscriber-specifically triggered special services, number analyses, call forwarding, special tariffs, and so on. Intelligence required for these operations may reside in the exchange or, now more commonly, in an intelligent network (IN) that is connected to a basic network (such as a public switched telephone network PSTN).

The intelligent network enables faster, easier and more flexible implementation and control of services. This takes place by displacing at least part of service control away from the exchange to a separate functional unit in the intelligent network. Consequently, the services can be made independent of the operation of the basic network, and the structure of the basic network and its software need not be changed upon change or addition of services. An example of such an intelligent network is described in recommendations of the International Telecommunications Union (ITU-T) Q-1200 series. The equipment or network element carrying out the tasks determined by the intelligent network service control function/s (SCF) is called a service control point (SCP). Within the scope of the present application, SCF and SCP are equal, and will hereinafter be called SCP. The SCP gives call set-up instructions to the exchange, or the exchange may inquire call set-up instructions from the SCP. Exchanges responsible for an intelligent network interface are called service switching points (SSP). They comprise at least a service switching function (SSF) and a call control function (CCF). The call control function CCF is not a function associated with the intelligent network, but it is a standard existing function in exchanges and comprises high-level call handling functions of an exchange, such as establishing and releasing transmission connections. The service switching function SSF is an interface between the call control function CCF and the service control point SCP. Within the scope of the present application, the service switching point SSP and the functional entity formed of the CCF and the SSF are equal, and will hereinafter be called SSP.

In conventional call set-up which takes place without the help of the intelligent network, telephone exchanges make independently all decisions associated with call routing. In the intelligent network, decisions associated with the routing are also made by the SCP.

Different stages of call set-up may include intermediate announcements which notify a party to the call, typically the calling subscriber, of progression of the call or give other call-related information, such as tariff information. In the intelligent network application, for example, upon detecting a specific stage or event of the call, the SCP may request the exchange to play an announcement to a call party, typically the calling subscriber. Nowadays, the exchange plays the announcement immediately upon being notified thereof, such as immediately after the request given by the SCP.

The handling of the prior art announcement presents such problems as:

1. Unnecessary charging: In chargeable announcements, charging starts immediately and cannot be interrupted in prior art exchanges. If the announcement is delivered at an early stage of call set-up and the call set-up fails, then the subscriber will possibly have to pay for an "unnecessary" conversation time which starts from the first moment of playing the announcement and ends in release which is carried out because of a call set-up problem (a release announcement may also become chargeable).

2. Unnecessary announcements: an announcement (associated with call forwarding, for example) is delivered at some stage of call set-up, although the call set-up may later fail. Consequently, the announcement is possibly unnecessary and unnecessarily reserves exchange recourses (the announcement delivered first delays the detection of the reason for release; the resources allocated to the call are possibly unnecessarily reserved) and announcement resources (if the announcement is unnecessary).

3. Collecting additional dialling is hindered: The exchange has to transmit an AddressCompleteMessage (ACM) towards the calling party in connection with an announcement. The message has at least two meanings: firstly, it indicates that dialling is completed and secondly, it provides the originating exchange (the direction towards subscriber A) with a state in which voices/announcements can be connected to the call. Because of the first meaning, additional dialling is no longer accepted to the dialled number (the dialling is send_complete). If the announcement is played at a very early stage of the call and if the incoming signalling used (either between the subscriber and the exchange or exchanges) is such that the dialling may be provided by more than one message, new additional dialling messages can no longer be received and the call has to be released, because additional digits required for the analysis of the dialled number cannot be requested/obtained. (Additional dialling may be requested from the network by R2, whereas ISUP, for example, provides the additional dialling directly by subsequent address messages (SAM)).

4. Impossibility of prioritizing or optimizing different announcements which are delivered at different call set-up stages: The basic operation is to deliver an announcement immediately after information is received which indicates that such an announcement has to be delivered in a service. Later in call set-up an announcement from another service can be received to be delivered. On some occasions, however, it would be sensible to deliver nothing but the second announcement. However, this is not possible, because the first announcement has already been delivered.

5. Centralized management of announcements caused by different features: An announcement determined by a feature cannot be blocked by another feature (which is activated later).

6. Call set-up delay: Announcements delivered at a call set-up stage cause call set-up delay, because the announcement is delivered immediately as a whole. If the announcement is shifted to a normal wait state of the ACM, for example, the stages of call set-up which are also normally executed rapidly can then be executed without delay.

7. No opportunity to generically control an announcement that has been delayed (and is also conditional, if necessary) at a call set-up stage: For example, an announcement which is delivered when an event takes place (in connection with call waiting, for example) at a speech stage could be set in advance at the call set-up stage.

BRIEF DESCRIPTION OF THE INVENTION

An object of the invention is thus to provide a method and equipment implementing the method so as to solve the above problems.

The objects of the invention are achieved by a method according to claim 1.

The invention also relates to a telecommunication network exchange according to claim 11.

The invention is based on the idea of totally separating the detection of the need for an announcement from playing the announcement. In the invention, the need for the announcement is detected in a conventional manner at a given stage of call set-up. In the invention, however, the exchange does not play the announcement immediately, but delays playing it up to a later stage of call set-up or in a later event, if necessary. The announcement may be played, for example, not until the collecting of additional dialling is definitely terminated, the call is confirmed to be successful, the exchange has to transmit an ACM message in backward direction in any case, the announcement is confirmed to be necessary/correct, and so on. The announcement is delayed to be played at a stage of call set-up or in the event which depends on the implementation of the respective exchange and on problems which are desired to be avoided by delaying the announcement. It should be noted that the exchange of the invention may play without delay some of the announcements in a conventional manner immediately after the detection of the need, in case this does not cause problems of the above type.

According to a preferred embodiment of the invention, when the need for an announcement is detected, at least data (such as announcement index or name) necessary for the selection of the correct announcement is stored from the announcement. In addition, the call set-up stage is preferably stored at which the announcement is desired to be delivered. This data may also be fixedly defined; certain announcements are played at a given stage, for instance. Other data to be stored may involve announcement category/type and priority or the rules which determine the way of handling other announcements (prohibit others, others can overwrite this, and so on) which are associated with the set-up of the same call and obtained for different reasons. If announcements are obtained more than once in a call, the data of each announcement is preferably separately stored in an announcement-specific data item in a data structure reserved for this purpose.

The data of the announcements may be stored in a queue-like or a stack-like data structure. The structure depends on what is done during the storage of the announcements. If the announcements are arranged chronologically according to set-up stage and priority, it is perhaps sensible to use a stack in which an announcement with the highest priority and associated with the next nearest call set-up stage is always uppermost in the stack. On the other hand, if the order is not defined in association with the announcement, it is possible to use a queue, for example, in which the announcements are inputted in succession according to the order of detection.

The data structure which includes the announcement data has to be examined at all call the set-up stages which can be defined for the announcements. When such a stage is encountered, it is necessary to start the handling of the data structure items associated with the call set-up in question. The handling procedure depends on whether the order of the data structure has been defined in connection with the storage. Furthermore, it should be noted that more than one announcement may be associated with the same stage; when a set-up stage is encountered, all the necessary announcements have to be delivered.

The data structure defining the announcement data may also be handled at call phases others than those at which announcements can be delivered. For example, a service associated with the call may delete from the data structure all announcements which fulfil certain conditions. Furthermore, a service may control the operation of a storage stage of the announcement to, for example, not to store the announcements in the data structure although the need for an announcement is detected, or to only accept announcements which fulfil certain conditions.

In the following, it will be briefly described how the invention solves or alleviates the above problems associated with prior art handling of announcements.

1. A chargeable announcement can be controlled to start at the latest possible stage of call set-up. An "unnecessary" chargeable time can then be minimized. If the chargeable announcement is found unnecessary at a playing stage which is set according to the invention, then there is no need at all to start the charging.

2. The number of unnecessary announcements is minimized by delaying the announcements up to the call set-up stage at which it can be ensured as far as possible that call set-up is successful. Such a sufficiently late stage occurs when a message ACM is awaited from the direction of subscriber B or even a later after an answer message (ANM) is received from the direction of subscriber B, for example.

3. Announcements can be delayed at a stage at which analyses of how much dialling is required have been carried out. Such a stage may be a stage at which an ACM or an answer is awaited from forward direction, for example.

4. Since the announcements are delivered not until the required call set-up stage has been reached or the event has been encountered, all the announcements can be optimized and prioritized on the basis of data defined for all announcements and on the basis of call set-up events. In other words, as long as the announcement has not been delivered, it can be blocked, accepted, or totally deleted from the data structure. Priorization rules may comprise "only play the announcement with the highest priority", "play the latest announcement only", "deliver the first announcement only", "announcement X and announcement Y are mutually exclusive", and so on.

5. Most problems are solved by centralized management of different types of data (announcement data structure and/or other features) and announcements determined in the same call on the basis of call events.

6. Set-up rate can be optimized by delaying the announcement to be played at a stage at which it does not delay the normal set-up until it is also otherwise necessary to wait for a message coming from the network, for example.

7. The mechanism of the invention allows the storing in advance of conditional (the condition being an event in the call, for example) announcements which are to be delivered later on in the call.

LIST OF FIGURES

Figure 2:
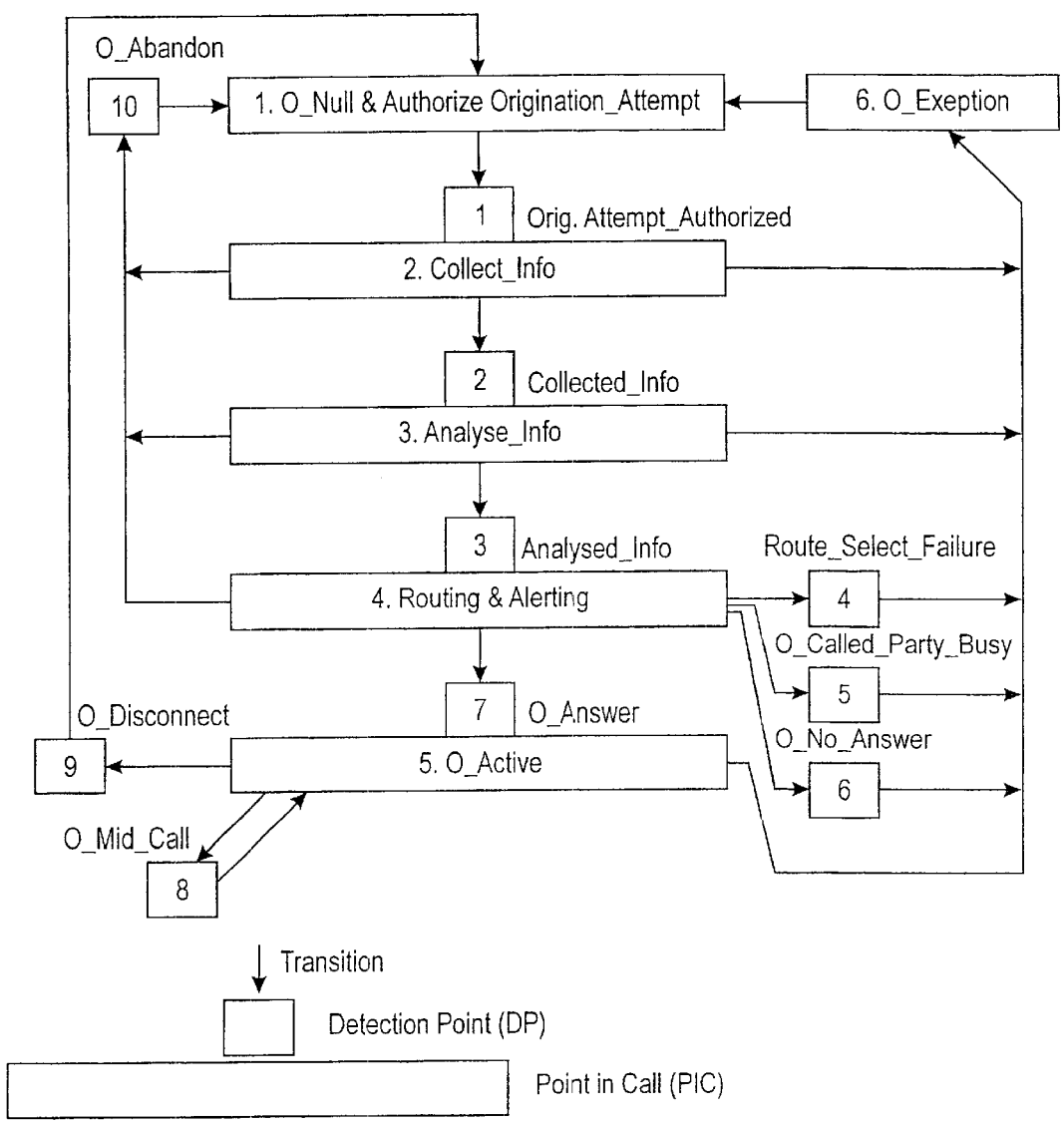
Figure 3:
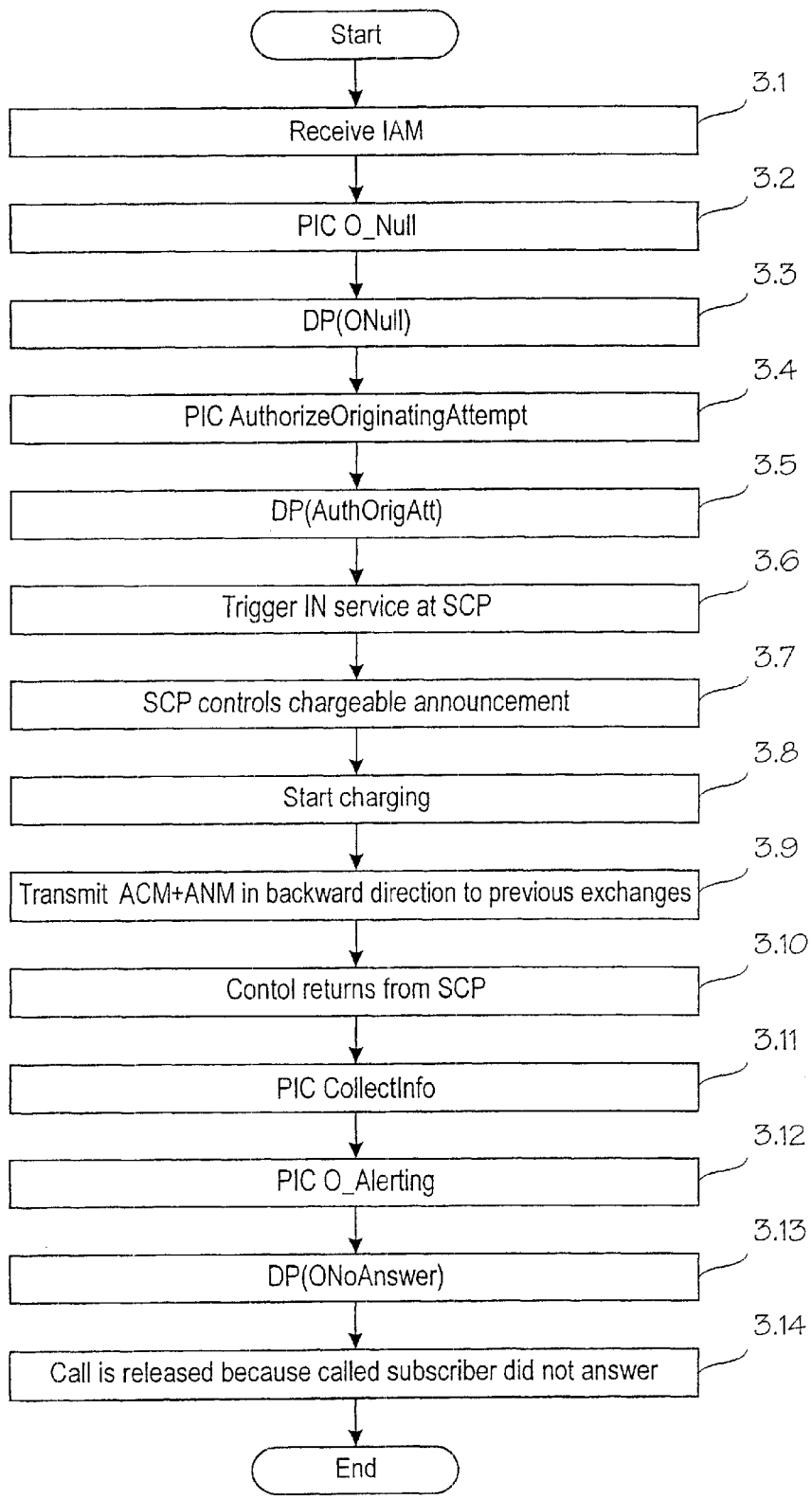
Figure 4:
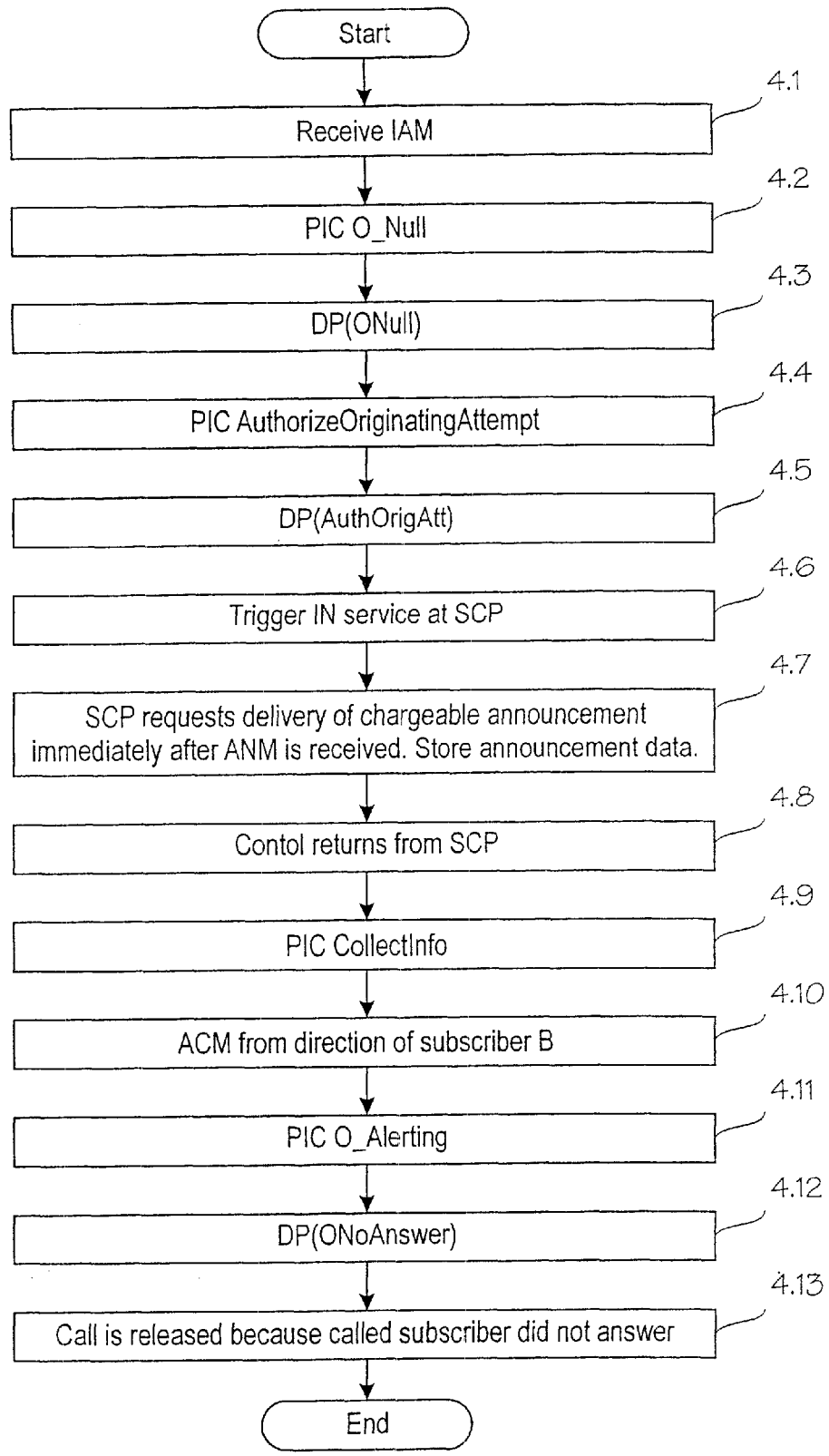
Figure 5:
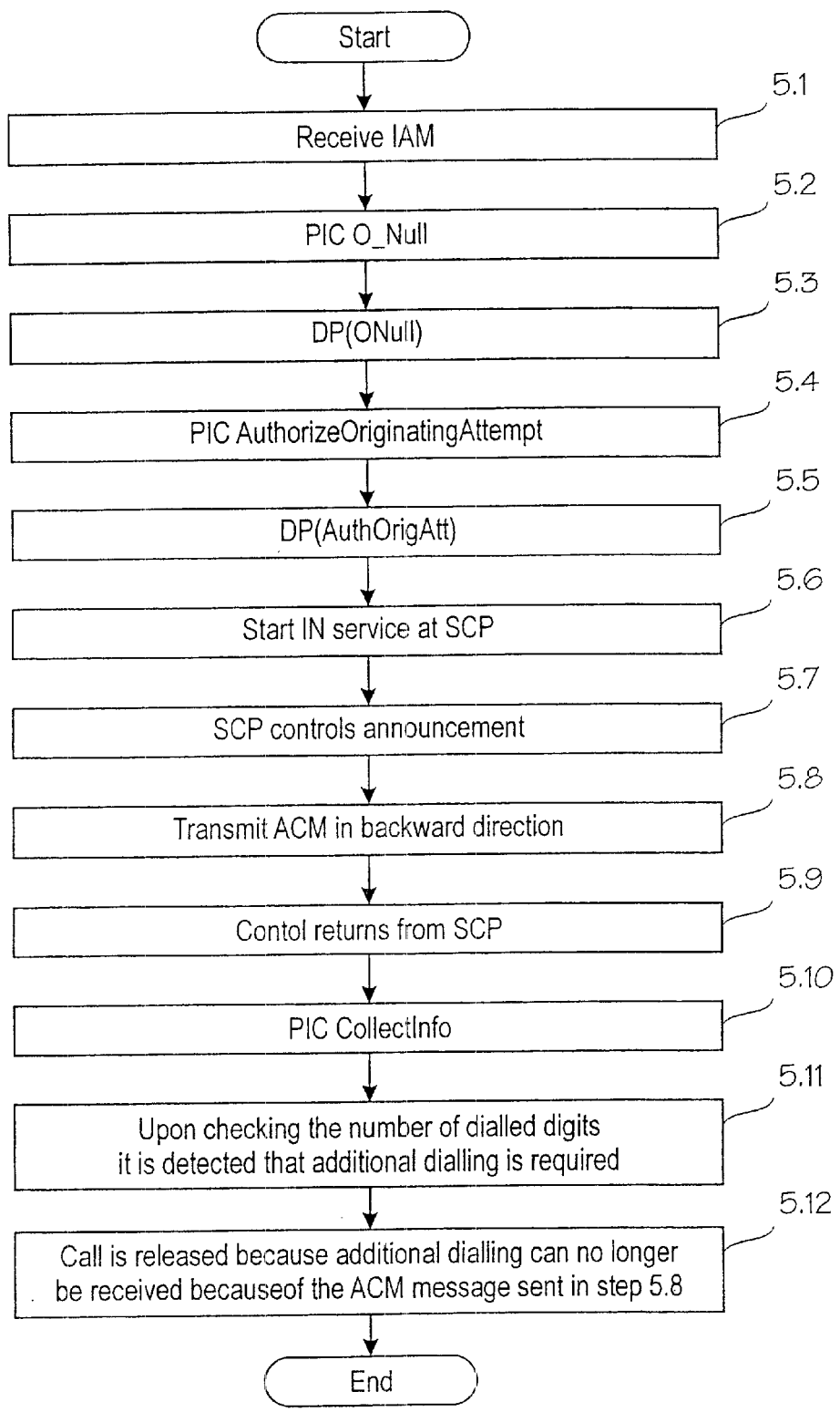
Figure 6:
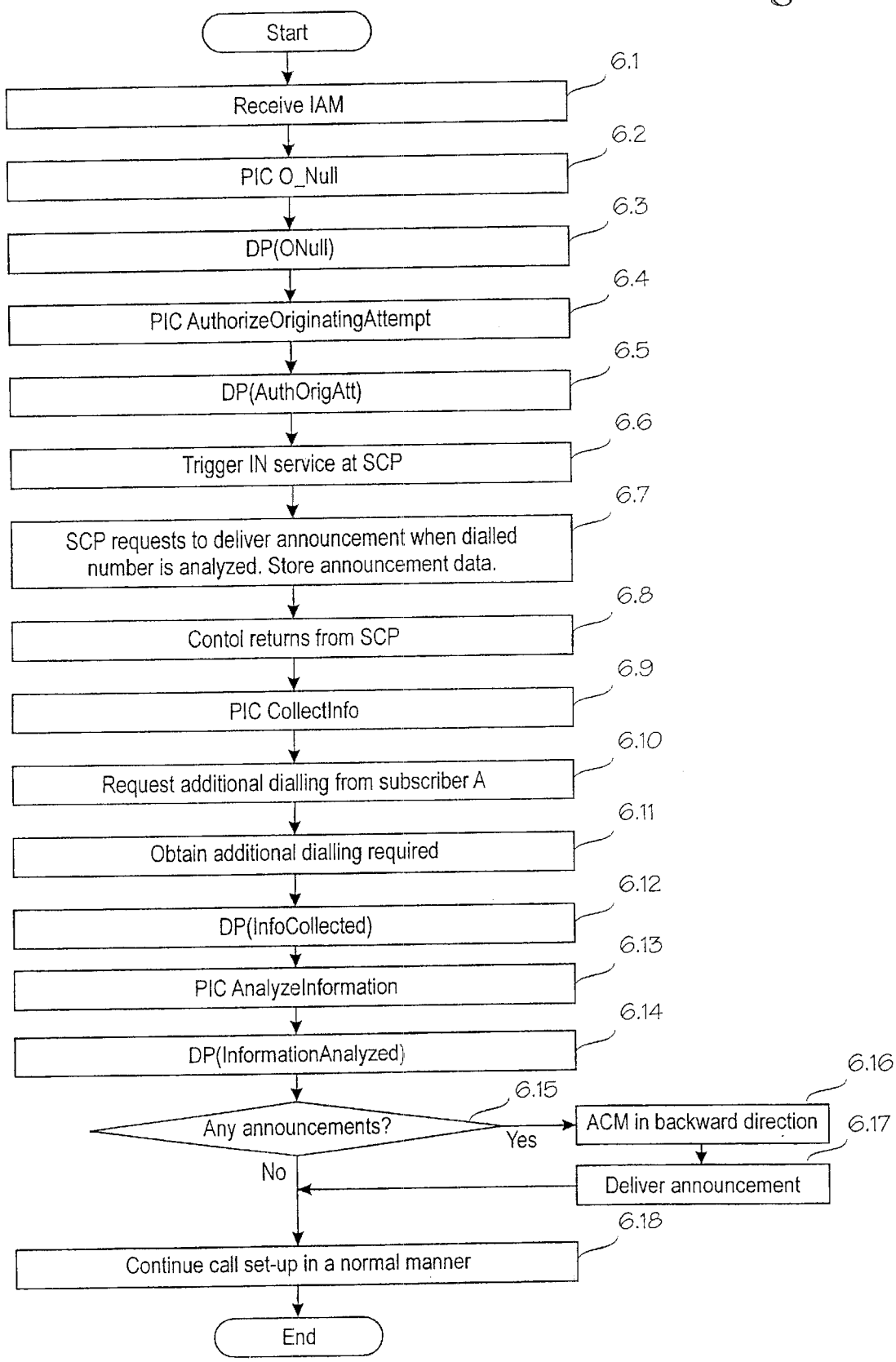
Figure 7:
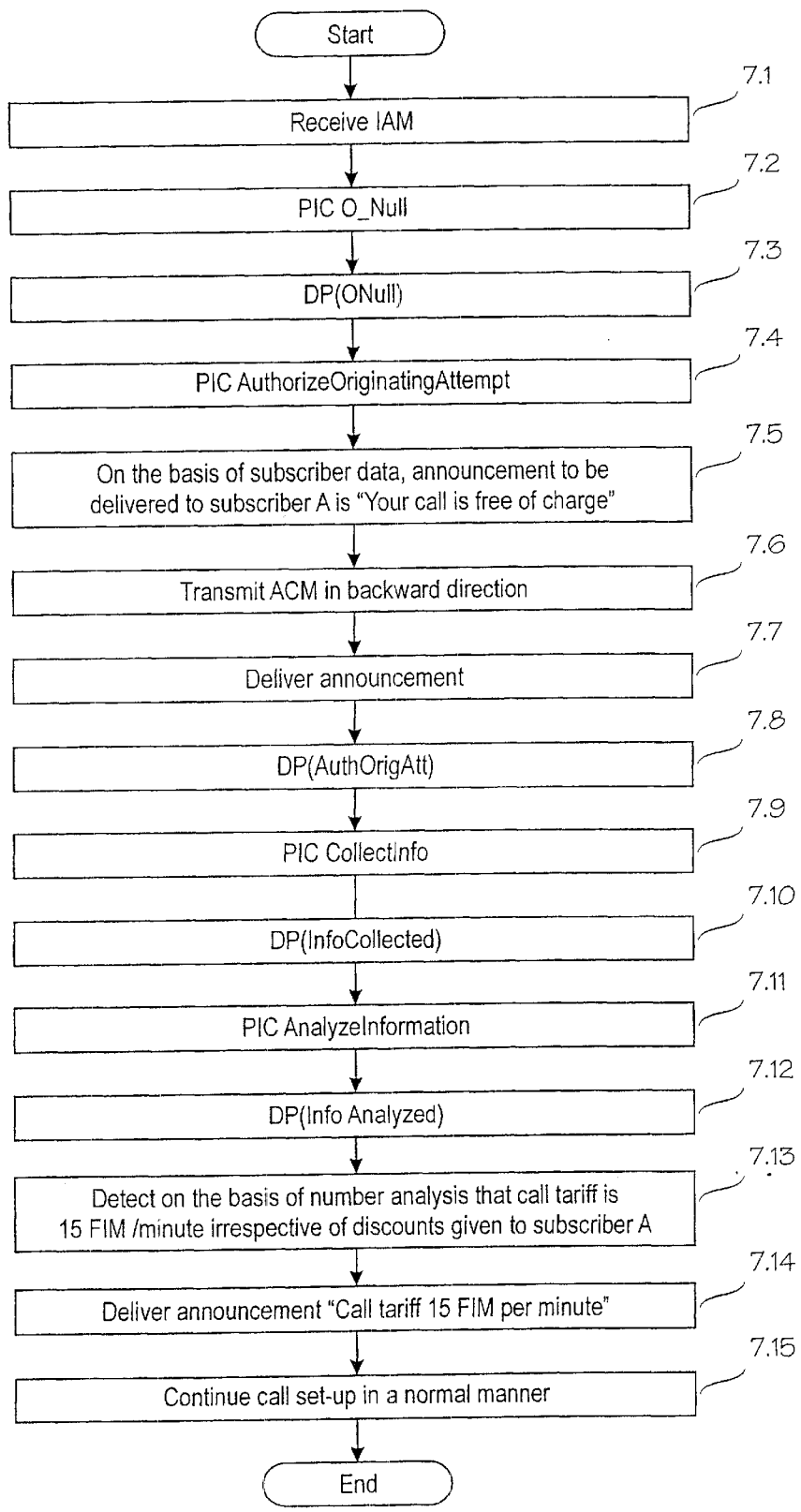
Figure 8:
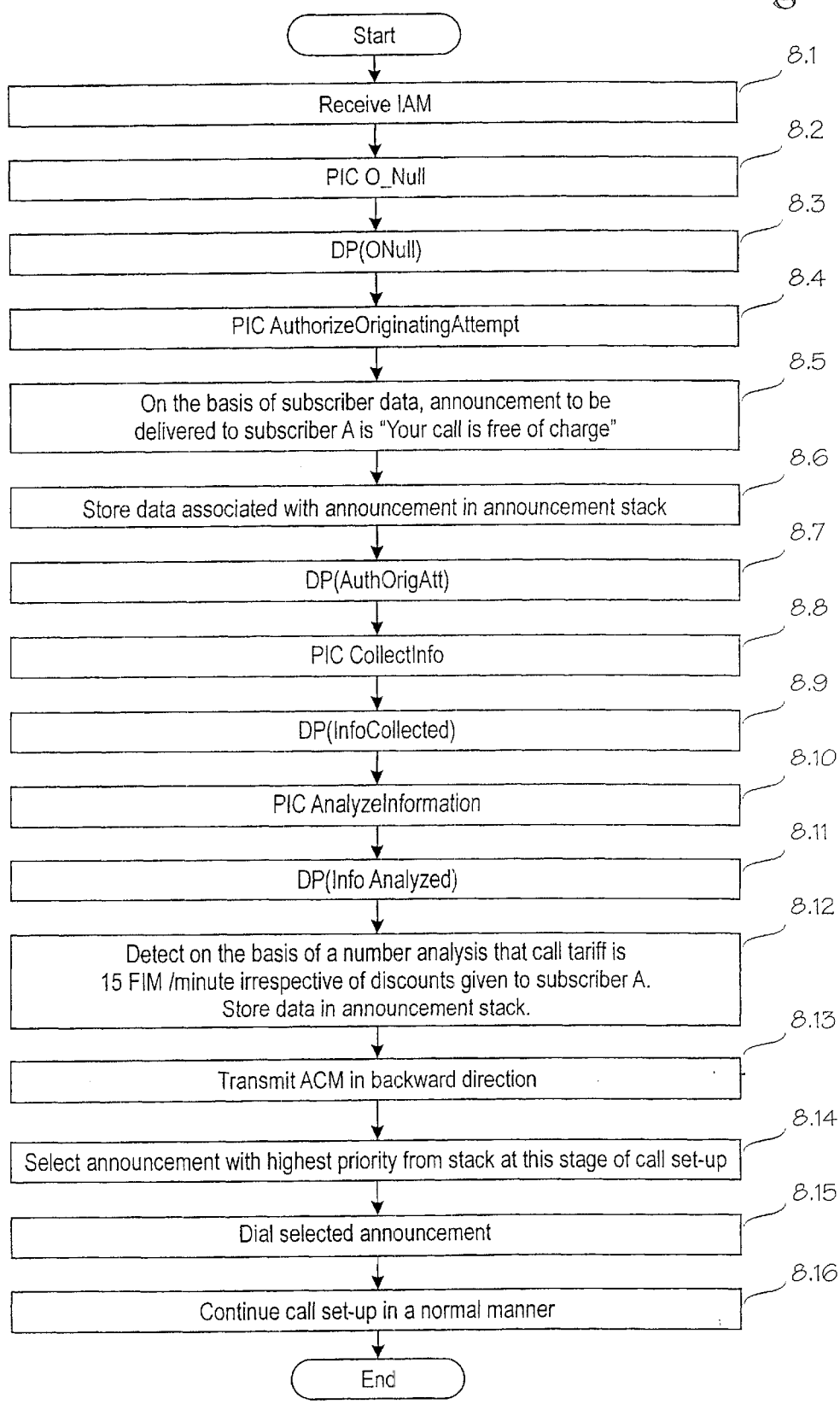

In the following, the invention will be described in more detail by means of preferred embodiments with reference to the accompanying drawings, in which FIG. 1 illustrates an exchange of a telecommunication network, which exchange is connected to an intelligent network, FIG. 2 shows signalling of a first preferred embodiment of the invention, and FIG. 3 shows a flow diagram of a first preferred embodiment of the invention, FIG. 4 shows a flow diagram of a fourth preferred embodiment of the invention, FIG. 5 illustrates a service switching point of an intelligent network, FIG. 6 illustrates a service control point of an intelligent network, FIG. 7 illustrates the delivery of several conflicting announcements during prior art call set-up, and FIG. 8 illustrates call set-up of the invention, in which said conflicting announcements are avoided.

DETAILED DESCRIPTION OF THE INVENTION

The present invention can be applied to any telecommunication exchanges in which announcements are delivered during call set-up. Typically, the exchanges comprise public switched telephone network (PSTN) exchanges and mobile communication network (PLMN) exchanges. The exchange may be connected to an intelligent network. The preferred embodiments of the invention are now disclosed by means of an example of an exchange that is connected to the intelligent network.

FIG. 1 shows an intelligent network IN and some examples of telecommunication systems associated therewith. FIG. 1 shows elements and functions that are relevant to intelligent network services. Network elements which comprise a service switching function (SSF) and a call control function (CCF) are called service switching points SSPs. The call control function CCF is not a function associated with the intelligent network, but it is a standard function in exchanges EX and comprises high-level call handling functions of the exchange, such as establishing and releasing transfer connections. The service switching function SSF is an interface between the call control function CCF and the service control function SCF. The SSF interprets requests transmitted by the SCF and forwards them to the CCF which starts the call control functions required by them. Correspondingly, the CCF uses the SSF for requesting instructions from the SCF. The SSF is fixedly connected to the CCF and acts as an interface for the CCF. Consequently, each SSF resides in the same exchange EX together with the CCF.

Network elements which comprise the SCF are called service control points (SCP). The service control function in a centralized authority in the intelligent network and comprises an execution environment for service logic programs, for example. For the intelligent network service, a service logic program is triggered at the service control point SCP, and the operation of the program determines the instructions transmitted to the SSP by the SCP at each stage of a call. Each program may comprise several instances to be carried out. The service control point SCP shown in FIG. 1 is a simplified service control point only including the service control function SCF and the necessary interfaces.

A service data function (SDF) is a database used by the SCF. The service logic programs may inquire and update SDF data. For example, subscriber-specific or service-number-specific data can be stored in the SDF. The SDF may be either a database management system at the service control point SCP or, as illustrated in FIG. 1, a separate service data point (SDP) supporting an SCF-SDF interface and comprising a database DB.

A specialized resource function (SRF) of the intelligent network is an interface for network mechanisms associated with interaction with the subscriber. The SRF may be connected to intelligent peripherals (IP) which comprise more advanced call handling functions as do the exchanges, or it may also be located at the service switching point SSP.

FIG. 1 also shows an exchange EX not belonging to the intelligent network, the exchange comprising, in addition to the CCF, a call control agent function (CCAF) which provides the users with access to the network. Since the EX comprises the CCAF, it can be a local exchange of the public switched telephone network PSTN or a mobile services switching center MSC that controls a base station subsystem BSS of the mobile telephone network PLMN. The CCAF may also be located at the service switching point.

In FIG. 1, the network elements are connected to one another via a signalling network SS7. Other networks, such as ISDN, may also be used.

A basic call state model (BCSM), defined in connection with the intelligent network, describes different stages of call set-up in the exchange. The state diagram of FIG. 2 describes an originating basic call state model (O-BSCM) according to ITU-T Q.1214. The intelligent network specifications group the call handling procedures that are carried out at the service switching point into rough phases called points in call (PIC). In FIG. 2, the PICs are indicated with rectangular blocks. The PICs associated with the O-BSCM include:

O_Null&Authorize_Origination_Attempt. The calling party indicates her/his desire to make an originating call (an offhook state in a subscriber line, an ITU-T Q.931 Setup message, an IAM message, for example), and the exchange checks her/his right/ability to make the call.

Collectinfo. The exchange collects dialling information, such as service information, prefixes and dialled address digits. Collectinfo is normally encountered during a call set-up stage at which one has to check that enough dialling is obtained. The collecting of dialling information is terminated after a required number of digits or the predetermined stop character have been received or when a control timer expires. It is possible to branch from here to PIC Exception and via DP O_Abandon to PIC O_Null&Authorize_ Origination_Attempt.

Analyze_Information. The information collected is analyzed and/or translated according to the dialling plan, making it possible to determine a routing address and call type. It is possible to branch from here to PIC Exception and via DP O_Abandon to PIC O_Null&Authorize_Origination_ Attempt.

Routing and Alerting. The routing instruction and call type are interpreted and the next route is dialled. An indication is awaited from a terminating BSCM of the fact that the called party has answered. It is possible to branch from here to PICs Route_Select_Failure, O_Called_Party_Busy or O_No_Answer.

O_Active. The connection is established.

A detection point (DP) is normally encountered after the termination of phase PIC. In FIG. 2, the DPs are indicated with square blocks. Call setup or release can be temporarily stopped at these detection points and further call handling instructions can be requested from the service control point SCP. At these detection points, call management can be transferred to the service control point. When transfer is made from the detection point DP to phase PIC, call management is transferred to the switching point. The basic call state model BCSM comprises transitions and events, in addition to phases PIC and detection points DP. The transitions indicate the progression of basic call connection set-up from one PIC to another. The events cause transitions to and from phase PIC. In FIG. 2, the transitions are indicated with arrows. Messages between the service switching point SSP and service control point SCP are called operations. For example, the SSP may have been configured to continue call set-up in response to the CollectInformation operation from phase PIC 2 at which subscriber dialling is collected.

One such operation is PlayAnnouncement by means of which the SCP requests the exchange to play an announcement to a call party, typically the calling subscriber. Nowadays, the exchange plays the announcement immediately upon being notified thereof.

Referring to FIG. 3, let us next study the delivery of a prior art chargeable announcement during call set-up according to a basic call state model O_BSCM. In this case, subscriber B may be a telephone answering service or the like, for example.

In step 3.1, an exchange (in this example a mobile services switching centre MSC) receives an IAM message from a previous exchange. This is followed by PIC O_Null in step 3.2, DP(O_Null) in step 3.3, PIC AuthorizeOriginatingAttempt in step 3.4 and DP(AuthOrigAtt) in step 3.5. The MSC triggers an intelligent network service at a control point SCP in step 3.6. The SCP delivers a PlayAnnouncement operation, as a consequence of which the MSC plays the announcement. The announcement may be a call event information, such as "Call is transferred". Since the announcement is chargeable, the MSC activates charging in step 3.8. Furthermore, the MSC transmits an ACM message and an ANM message in backward direction and plays the announcement, whereby the charging is also activated in the previous exchanges in step 3.9. Next, the SCP returns call set-up control to the MSC in step 3.10. The PICs CollectInfo, AnalyzeInfo and Routing in step 3.11 and Alerting in step 3.12 follow next. However, subscriber B does not answer, whereby the call passes to a detection point DP(O_No_Answer) and the call is released is steps 3.13 and 3.14. However, charging was active during the announcement and the subsequent call set-up which comprises a waiting time of the answer from subscriber B. Consequently, subscriber A is charged for an unnecessary announcement and a failed call.

In the following, a reference is made to FIG. 4 which describes how a chargeable announcement is delivered according to a preferred embodiment of the invention during call set up according to an O_BSCM state model.

In step 4.1, an exchange (in this example a mobile services switching centre MSC) receives an IAM message from a previous exchange. This is followed by PIC O_Null in step 4.2, DP(O_Null) in step 4.3, PIC AuthorizeOriginatingAttempt in step 4.4 and DP(AuthOrigAtt) in step 4.5. The MSC triggers an intelligent network service at an intelligent network service control point SCP in step 4.6. So far, call set up has proceeded as in FIG. 3. The SCP delivers a PlayAnnouncement operation which, besides notifying which announcement should be delivered, also notifies when and possible on which terms the announcement should be delivered. In the example of FIG. 4, the SCP requests the MSC to play the announcement after the reception of an answer message ANM from the direction of subscriber B. As a consequence, the MSC does not play the announcement immediately but delays playing the announcement and puts announcement-related data to wait in a suitable data structure, such as an announcement stack. The MSC does not need to transmit an ACM to the previous exchange or to start charging. The SCP returns call set-up control to the MSC in step 4.8. PICs CollectInfo, AnalyzeInfo and Routing follow next in step 4.9. During these PICs, the MSC receives the ACM message from the direction of subscriber B in a normal manner, and transmits it in the direction of subscriber A. An answer from subscriber B is awaited at PIC O_Alerting in step 4.11. However, subscriber B does not answer, whereby the call passes to a detection point DP(O_No_Answer) and the call is released in steps 4.12 and 4.13. Consequently, the answer message ANM, the condition for playing the announcement, was never received nor was the chargeable announcement played or the charging activated. Subscriber A is thus not charged for the unnecessary announcement and the failed call.

Referring to FIG. 5, let us next study the delivery of a prior art announcement during call set-up according to a O_BSCM state model when signalling is used in which dialling is provided by several messages.

In step 5.1, an exchange (in this example a mobile services switching centre MSC) receives an IAM message from a previous exchange. This is followed by PIC O_Null in step 5.2, DP(O_Null) in step 5.3, PIC AuthorizeOriginatingAttempt in step 5.4 and DP(AuthOrigAtt) in step 5.5. The MSC triggers an intelligent network service at a control point SCP in step 5.6. In step 5.7 the SCP delivers a Play Announcement operation, as a consequence of which the MSC immediately transmits an ACM message in backward direction and plays the announcement in step 5.8. Next, the SCP returns call set-up control to the MSC in step 5.9. PIC CollectInfo follows next in step 5.10. When the number of dialled digits are checked, it is detected (in step 5.11) that additional digits are required for number analysis. However, the MSC can no longer receive additional dialling from the previous exchange, since the ACM message indicating that the dialling is completed was transmitted because of the announcement in step 5.8. Consequently, the call has to be released in phase CollectInfo (in step 5.12).

Referring to FIG. 6, let us next study the delivery of an announcement of the invention during call set-up according to an O_BSCM state model when signalling is used in which dialling is provided by several messages.

In step 6.1, an exchange (in this example a mobile services switching centre MSC) receives an IAM message from a previous exchange. This is followed by PIC O_Null in step 6.2, DP(O_Null) in step 6.3, PIC AuthorizeOriginatingAttempt in step 6.4 and DP(AuthOrigAtt) in step 6.5. The MSC triggers an intelligent network service at a control point SCP in step 6.6. So far, call set-up has proceeded as in FIG. 5. In step 6.7 the SCP delivers a PlayAnnouncement operation which, besides notifying which announcement should be delivered, also notifies when and possible on which terms the announcement should be given. In the example of FIG. 6, the SCP requests the MSC to play the announcement after the dialled B number is analyzed, i.e. after PIC AnalyzeInfo. Consequently, the MSC does not play the announcement immediately but puts announcement-related data to wait in a suitable data structure, such as an announcement stack. Furthermore, the MSC does not need to transmit the ACM to the previous exchange. The SCP returns call set-up control to the MSC in step 6.8. PIC CollectInfo follows next, in which in is detected upon the checking of the dialled digits that additional dialling is needed (in step 6.9). Depending on the signalling used, additional dialling is either requested by a special request message or it is awaited (for a period of time determined by a timer) whether additional dialling is still being provided in step 6.10. Additional dialling required is received in step 6.11 and the routine proceeds (in step 6.12) via a detection point DP(lnfoCollected) to PIC AnalyzeInfo (in step 6.13). Call set-up reaches a detection point DP(Analyzed__Info) in step 6.14, and it is then checked if announcements to be played exist at this stage (in step 6.15). Since the announcement determined in step 6.7 is found in the announcement stack, the MSC transmits the ACM message in backward direction to the previous exchange (in step 6.16) and plays the announcement found in the announcement stack (in step 6.17). Next, call set-up proceeds in a normal manner (in step 6.18).

Referring to FIG. 7, let us next study the prior art delivery of several conflicting announcements during call set-up according to an O__BSCM state model. In this example, the exchange controls all stages of call set-up.

In step 7.1, an exchange (in this example a mobile services switching centre) receives an IAM message from a previous exchange. This is followed by PIC O__Null in step 7.2, DP(O__Null) in step 7.3, PIC AuthorizeOriginatingAttempt in step 7.4. The exchange then discovers on the basis of subscriber data that an announcement "your call is free of charge" has to be given to subscriber A in step 7.5. The MSC transmits an ACM message to the previous exchange in backward direction (in step 7.6) and plays the announcement to subscriber A (in step 7.7). Next, the call proceeds via a detection point DP(AuthOrigAtt), PIC CollectInfo, a detection point DP(InfoCollected), PIC AnalyzeInformation to a detection point DP(InfoAnalyzed) in steps 7.8 to 7.12. As a result of the number analysis it is detected that a chargeable call is involved irrespective of the discounts given to subscriber A (in step 7.13). A new announcement "call tariff 15 FIM per minute", conflicting with the first announcement, has to be given to subscriber A in step 7.14. Next, call set-up is continued in a normal manner.

In the following, reference is made to FIG. 8 which describes how announcements are optimized or prioritized in accordance with the invention, by means of which it is possible to avoid the delivery of above several conflicting announcements. In this example, the exchange controls all stages of call set-up.

In step 8.1, an exchange (in this example a mobile services switching centre MSC) receives an IAM message from a previous exchange. This is followed by PIC O__Null in step 8.2, DP(O__Null) in step 8.3, PIC AuthorizeOriginatingAttempt in step 8.4. The exchange then discovers on the basis of subscriber data (in step 8.5) that an announcement "your call is free of charge" has to be given to subscriber A, the type of the announcement being a tariff announcement with priority 3 (step 8.5). So far, the call is set-up as in FIG. 7. Here, however, the MSC does not play the announcement immediately but puts announcement-related data to wait in a suitable data structure, such as an announcement stack (step 8.6). In this example, a notification is stored on the necessity of giving the announcement in question immediately after the dialled number has been analyzed. Next, the call proceeds via a detection point DP(AuthOrigAtt), PIC CollectInfo, a detection point DP(InfoCollected), PIC AnalyzeInformation to a detection point DP(InfoAnalyzed) in steps 8.7 to 8.11. As a result of the number analysis it is detected that a chargeable call is involved, irrespective of the discounts given to subscriber A, and that an announcement "Call tariff 15 FIM per minute" has to be given to subscriber A, the type of the announcement being a tariff announcement with priority 1 (step 8.12), and the notification of the announcement is stored in the announcement stack. The MSC transmits an ACM message in backward direction in step 8.13. The exchange checks the announcement stack for tariff announcements that are set for said detection point. If two or more tariff announcements are found from the stack, the exchange compares the priorities of the announcements and selects the announcement with a higher priority (in step 8.14). The exchange then plays the selected announcement (in step 8.15). Since in the example of FIG. 8, the announcement stored in step 8.12 has a higher priority, it is selected and the first announcement (stored in step 8.6) is deleted from the announcement stack. Consequently, subscriber A is given only one announcement including the correct information. Next, call set-up continues in a normal manner in step 8.16.

In the above examples, the exchange checked the announcement stack or a corresponding data structure only at a point relevant to the description of each example. However, it is to be understood that the exchange may check and handle the announcement stack at all call set-up stages that can be defined for the announcements (all detection points DP, for example). In addition, other points may exist at which the exchange examines and handles the announcement stack.

It is to be understood that the description and the related figures are only intended to illustrate the present invention. It will be apparent to those skilled in the art that many variations and modifications can be made to the invention without departing from the scope and spirit of the invention disclosed in the attached claims.

What is claimed is:

1. A method of playing a chargeable announcement during a call set-up in a telecommunication network, the method comprising:

detecting a need for a chargeable announcement at a given stage of the call set-up; and delaying playing the chargeable announcement from said given stage of the call set-up to a later stage of the call set-up at which it is determined that the chargeable announcement is either necessary or at which time playing the chargeable announcement does not endanger success of call set-up.

2. A method as claimed in claim 1, wherein the playing of the chargeable announcement is delayed until a collection of additional dialing is complete.

3. A method as claimed in claim 1, comprising delaying the playing of the chargeable announcement until it is required by the call set-up that the telecommunication exchange transmit a signaling message in the direction of the calling subscriber, the signaling message informing that collection of dialing is completed.

4. A method as claimed in claim 1, further comprising delaying the chargeable announcement to be played until call set-up is confirmed to be successful.

5. A method as claimed in claim 1, further comprising storing, in response to the detection of the need for the chargeable announcement, at least the data required for the selection of the chargeable announcement.

6. A method as claimed in claim 1, comprising:

storing, in response to the detection of the need for the chargeable announcement, at least data required for the selection of the chargeable announcement, if the pre-determined storing conditions are fulfilled.

7. A method as claimed in claim 5 or 6 further comprising storing one or more of the following items of information: information on a call set-up stage at which the chargeable announcement is desired to be played; conditions or rules according to which the chargeable announcement is played or left unplayed at a desired call set-up stage; and conditions or rules how the chargeable announcement is handled in relation to other announcements.

8. A method as claimed in claim 5 comprising:

storing data of each chargeable announcement of the call in a different data item in a data structure.

9. A method as claimed in claim 8, comprising:

examining said data structure at all the call set-up stages defined for the chargeable announcements; and handling all data structure items associated with the current stage of a call set-up in the data structure.

10. A method as claimed in claim 9 further comprising:

handling said data structure at least at one call set-up stage which cannot be defined for the chargeable announcements, said handling including, the deletion of one or more chargeable announcements from the data structure when a predetermined condition is fulfilled.

11. A telecommunications network exchange, comprising:

a mechanism configured to detect a need for a chargeable announcement at a given stage of a call set-up;

a mechanism configured to play the chargeable announcement to at least one party to the call set-up; and a mechanism configured to delay the chargeable announcement from the given stage of the call set-up to a predetermined later call set-up stage at which it is determined that the chargeable announcement is correct and necessary or at which time playing the chargeable announcement would not risk success of the call set-up.

12. An exchange as claimed in claim 11, wherein the exchange is arranged to store data of the different chargeable announcements of each call as dedicated data items in a call-specific data structure.

13. An exchange as claimed in claim 12 wherein said data comprises at least data necessary for selection of the chargeable announcement and possibly one or more of the following items of information: information on the call set up stage at which the chargeable announcement is desired to be played; and conditions or rules according to which the chargeable announcement is played or left unplayed at the desired call set-up stage; conditions or rules about how the chargeable announcement is handled in relation to other announcements.

14. An exchange as claimed in claim 12 or 13, wherein the exchange is arranged to examine said data structure at all the call set-up stages which can be defined for the chargeable announcements and handle all the data items in the data structure that are associated with the current call set-up stage.

15. An exchange as claimed in claim 14, wherein the exchange is arranged to handle said data structure at least at one call set-up stage which can not be defined for the chargeable announcements.

16. A method of playing a chargeable announcement during a call set-up in a telecommunication network, the method comprising:

detecting a need for a chargeable announcement at a given stage of the call set-up;

storing, in response to detecting the need for said chargeable announcement, data required for selection of the chargeable announcement and at least one condition required for playing the chargeable announcement at a later stage of the call set-up;

continuing the call set-up without playing the chargeable announcement at said given stage of the call set-up; and playing the chargeable announcement at a later stage of the call set-up when at least one stored condition is satisfied stored selection data.

17. A telecommunication network exchange, comprising:

a first mechanism configured to detect a need for a conditional chargeable announcement at a given stage of a call set-up;

a second mechanism configured to store, in response to said first mechanism detecting the need for the conditional chargeable announcement, data required for selection of the conditional chargeable announcement and at least one condition required for playing the chargeable announcement at a later stage of the call set-up;

a third mechanism configured to play the chargeable announcement to at least one party to the call set-up; and a fourth mechanism configured to disable playing of said conditional chargeable announcement by said third mechanism at said given stage of the call set-up, and configured to enable playing of said conditional chargeable announcement by said third mechanism at a later stage of the call set-up when at least one stored condition is met.

* * * * *